United States Patent
Fröhlich et al.

(10) Patent No.: US 11,131,284 B2
(45) Date of Patent: Sep. 28, 2021

(54) RESTARTING METHOD AND RESTARTING ASSEMBLY FOR STARTING AN INTERNAL COMBUSTION ENGINE OF A MOTOR VEHICLE

(71) Applicant: Volkswagen Aktiengesellschaft, Wolfsburg (DE)

(72) Inventors: Björn Fröhlich, Gifhorn (DE); Jan-Lars Dalchow, Braunschweig (DE)

(73) Assignee: VOLKSWAGEN AKTIENGESELLCHAFT, Wolfsburg (DE)

( * ) Notice: Subject to any disclaimer, the term of this patent is extended or adjusted under 35 U.S.C. 154(b) by 168 days.

(21) Appl. No.: 16/074,294

(22) PCT Filed: Feb. 8, 2017

(86) PCT No.: PCT/EP2017/052686
§ 371 (c)(1),
(2) Date: Jul. 31, 2018

(87) PCT Pub. No.: WO2017/144271
PCT Pub. Date: Aug. 31, 2017

(65) Prior Publication Data
US 2020/0173413 A1    Jun. 4, 2020

(30) Foreign Application Priority Data
Feb. 23, 2016   (DE) .................... 10 2016 202 756.5

(51) Int. Cl.
*F02N 11/08*   (2006.01)
*B60K 28/12*   (2006.01)
(Continued)

(52) U.S. Cl.
CPC .......... *F02N 11/0833* (2013.01); *B60K 28/12* (2013.01); *B60K 28/14* (2013.01);
(Continued)

(58) Field of Classification Search
CPC ............. F02N 11/0814; F02N 11/0818; F02N 11/0822; F02N 2200/0807
See application file for complete search history.

(56) References Cited

U.S. PATENT DOCUMENTS

| | | | |
|---|---|---|---|
| 6,504,259 B1 * | 1/2003 | Kuroda ................. | B60W 10/08 290/40 C |
| 6,702,718 B2 | 3/2004 | Tani et al. | |

(Continued)

FOREIGN PATENT DOCUMENTS

| | | |
|---|---|---|
| CN | 102444483 A | 5/2012 |
| DE | 10 2009 002 952 A1 | 2/2011 |

(Continued)

OTHER PUBLICATIONS

Search Report for Russian Patent Application No. 2018133457/07, dated May 7, 2019.
(Continued)

*Primary Examiner* — Sizo B Vilakazi
*Assistant Examiner* — Anthony L Bacon
(74) *Attorney, Agent, or Firm* — Pearl Cohen Zedek Latzer Baratz LLP

(57) ABSTRACT

The invention relates to a restarting method for automatically starting an internal combustion engine (2) of a motor vehicle (3) by means of a brake pedal actuation, comprising the following steps: detecting a brake pressure (p) by means of a brake pressure sensor (14); emitting a corresponding brake pressure signal sequence to a control device (13); determining a brake pressure profile ($p_{pr}$) from the brake pressure signal sequence; determining a reference pressure value ($p_R$) from the brake pressure profile; detecting a brake release status, wherein, with the release of a brake pedal, a brake pressure decrease ($\Delta p$) is detected based on the determined reference pressure value ($p_R$), with said decrease exceeding a pressure decrease limit value ($\Delta p_G$); emitting a (Continued)

starting signal ($S_{WS}$) to a starter (15) for starting the internal combustion engine (2), if the brake release status has been detected. The invention also relates to a restarting assembly for a motor vehicle (1) for carrying out a method of this type.

18 Claims, 3 Drawing Sheets

(51) Int. Cl.
*B60K 28/14* (2006.01)
*F02N 11/10* (2006.01)

(52) U.S. Cl.
CPC ...... *F02N 11/101* (2013.01); *F02N 2200/063* (2013.01); *F02N 2200/0803* (2013.01); *F02N 2200/0805* (2013.01); *F02N 2200/0815* (2013.01); *F02N 2200/102* (2013.01)

(56) References Cited

U.S. PATENT DOCUMENTS

| | | | |
|---|---|---|---|
| 8,308,607 B2 | 11/2012 | Christen et al. | |
| 2005/0131622 A1* | 6/2005 | Braun | F02N 15/063 701/113 |
| 2011/0144876 A1 | 6/2011 | Miah | |
| 2011/0238284 A1 | 9/2011 | Bollig et al. | |
| 2012/0080001 A1 | 4/2012 | Saito et al. | |
| 2014/0066255 A1* | 3/2014 | Yu | F02N 11/0822 477/203 |
| 2014/0066256 A1* | 3/2014 | Yu | F02N 11/0822 477/204 |
| 2014/0358406 A1 | 12/2014 | Mori et al. | |
| 2016/0009258 A1* | 1/2016 | Betz | B60T 8/17 701/70 |
| 2017/0113693 A1* | 4/2017 | Bularz | B60W 30/18027 |

FOREIGN PATENT DOCUMENTS

| | | |
|---|---|---|
| DE | 10 2013 216 622 A1 | 3/2014 |
| EP | 1 063 424 B1 | 12/2000 |
| EP | 1 541 864 B1 | 9/2007 |
| EP | 2358990 A1 | 8/2011 |
| EP | 2 808 520 A1 | 12/2014 |
| JP | 2000-274272 A | 10/2000 |
| JP | 2005-171998 A | 6/2005 |
| JP | 2010 174711 A | 8/2010 |
| JP | 2012180747 A | 9/2012 |
| JP | 2013113280 A | 6/2013 |
| JP | 2015-105586 A | 6/2015 |
| KR | 20-0151593 Y | 7/1999 |
| KR | 10 2013 0 015 365 A | 7/2013 |
| RU | 2012139193 A | 3/2014 |
| WO | WO 2015/075526 A1 | 5/2015 |
| WO | WO 2015/079296 A1 | 6/2015 |

OTHER PUBLICATIONS

Search report for German Patent Application No. 10 2016 202 765.5, dated Jan. 1, 2017.
International Search Report of PCT Application No. PCT/EP2017/052686, dated Apr. 18, 2017.
Office Action for Chinese Patent Application No. 201780013084.1, dated Dec. 18, 2019.

* cited by examiner

RESTARTING METHOD AND RESTARTING ASSEMBLY FOR STARTING AN INTERNAL COMBUSTION ENGINE OF A MOTOR VEHICLE

CROSS-REFERENCE TO RELATED APPLICATIONS

This application is a National Phase Application of PCT International Application No. PCT/EP2017/052686, International Filing Date Feb. 8, 2017, claiming priority of German Patent Application No. 10 2016 202 765.5, filed Feb. 23, 2016, which is hereby incorporated by reference.

FIELD OF THE INVENTION

The present invention relates to a restarting method and a restarting assembly for starting an internal combustion engine of a motor vehicle.

BACKGROUND OF THE INVENTION

Such methods and assemblies have become common in the context of a start-stop functionality. Start-stop functionalities allow the internal combustion engine to temporarily shut down in stop phases without the driver having to manually actuate the driving switch for that purpose. At the end of such a standstill phase, the shut-off internal combustion engine is automatically started again (restarted), as soon as the driver wants to drive on. The restarting even takes place without manually actuating the driving switch.

There are a plurality of already realized methods and corresponding devices for the restarting process. In a method in accordance with the European Patent Application EP 1 063 424 B1, the restarting process is initiated in response to the brake pedal position, which is recorded by suitable sensors. Upon releasing of the brake pedal (brake position), the internal combustion engine of the motor vehicle is started in response to the brake pedal returning to the initial position thereof. The starting process is thereby triggered by the recording of a defined pass-through position of the brake pedal, in response to it returning to the initial position thereof.

The European Patent Application EP 1 541 864 B1 describes a pressure-actuated method. It provides that the time characteristic of the brake pressure be evaluated upon releasing of the brake pedal, and that the restarting process then be triggered in response to a negative brake pressure gradient. The brake pressure gradient must thereby exceed a threshold value for the control electronics in a control unit to trigger the restarting process in the context of a start-stop functionality. In this approach, it can happen that the threshold value is not able to be reached when the brake is released very slowly, so that additional measures are required to initiate the restarting.

For example, an additional lower threshold $p_{SU}$ of the brake pressure can be considered, in response to which the restarting process is then initiated. This relationship is discernible in FIG. 5, which illustrates a brake force profile $p_{Pr}$ (brake force p over time t). The stop phase begins in response to a stop threshold value $p_{SS}$ being exceeded and ends in response to mentioned lower threshold value $p_{SU}$ being undershot, whereupon the restarting is triggered. Value $p_{SU}$ is thereby below value $p_{SS}$ by a fixed pressure differential $\Delta p_{Fix}$.

A restarting can be perceived as delayed in connection with the gradient method, in particular, where the restarting process is not triggered in response to a too small falling brake pressure gradient, rather not until lower pressure threshold value $p_{SU}$ is undershot.

It is, therefore, an object of the present invention to provide a restarting method and, accordingly, a restarting assembly that will ensure a responsive start-stop functionality.

SUMMARY OF THE INVENTION

This objective is achieved by the method according to the present invention in accordance with the claims and by the restarting assembly in accordance with the claims.

Other advantageous embodiments of the present invention will become apparent from the dependent claims and from the following description of preferred exemplary embodiments of the present invention.

The restarting method according to the present invention for automatically starting an internal combustion engine of a motor vehicle by a brake pedal actuation is distinguished by the following:

The brake pressure is first recorded by a brake pressure sensor, and the associated brake pressure signal sequence is output to a control unit, for example, to an engine control unit (ECU). On the basis of this brake pressure signal sequence, a brake pressure profile is defined from which, in turn, a reference pressure value is determined. This reference pressure value is used as a (variable) output value for recording a brake release status. This means that, in the context of a start-stop functionality, the stop phase is not ended in response to fixed, preset brake pressure threshold values (see above), but rather using the determined reference pressure value as a baseline.

Upon releasing of a brake pedal, the brake release status is recorded in response to a brake pressure drop exceeding a pressure drop limit value, using the determined reference pressure value (variable) as a baseline, thus a defined (but possibly variable) deviation from the reference pressure value. The start signal is sent to a starter for starting an internal combustion engine in response to this brake release status being recorded.

Thus, using the individual braking characteristics as a baseline and from the determination of an individual reference pressure value from an actual brake pressure profile, the above described inventive method makes it possible to derive a responsive restarting condition that, in some instances, is also driver-specific and is determined on the basis of a variable brake release status, thereby noticeably enhancing the restarting performance for the driver in that he/she always has the "same" feeling that, in some instances, is also personalized to him/her. The restarting characteristics are thereby optimized.

There are variants where the reference pressure value may be determined as a function of a profile section of the determined brake pressure profile. During a start-stop phase, where it is actually a stop-start phase, a brake pressure profile typically has a hat shape (compare FIGS. 3-5). This means that, at first, there is a relatively steep rise in the brake pressure. It is maintained substantially constantly at a plateau during the stop phase and then falls again shortly before the restarting, until it is completely reduced. To influence the restarting characteristics, different sections of this profile may then be evaluated to define a reference pressure value.

It is possible, for example, to evaluate the rising section and, for example, determine the reference pressure value in the transition phase from the rise into the plateau phase.

Another option provides for evaluating the profile of the plateau section, in which the maximum brake pressures are maintained, by calculating an average value from these signals.

Another option provides for recording the transition from the plateau section into the falling section and for specifying a reference pressure value here.

Another variation may also provide for calculating the average of the transition values from the rising section into the plateau section and from the plateau section into the falling section, and for the reference pressure value to be thereby determined.

A group of specific embodiments of the method provides that the reference pressure value be determined as a function of a plurality of start-stop cycles within an operating cycle (for example, the drive of a specific driver). It is, thus, possible to determine a driver-specific, preferred reference pressure value and specify it as the initial value for defining the brake release status.

An especially simple method for defining the reference pressure value provides for defining the brake pressure maximum of a determined brake pressure profile and, using this as a baseline, for recording the brake release status.

There are also specific embodiments where the pressure drop limit value may be variably and individually defined.

There are methods, for example, where the pressure drop limit value may be defined as a function of the determined reference pressure value. It may be defined, for example, as a proportional deviation from the reference pressure value. Thus, in the same way, at very high, maximum brake pressures, for example, the pressure drop limit value is increased or decreased in order to record the brake release status.

In other methods, the pressure drop limit value may also be linearly, degressively or progressively increased or also decreased in response to the reference pressure value.

In other methods, the pressure drop limit value may also be defined as a function of the adjustable shifting characteristics of an automatic transmission. Thus, it is to be increased, for example, in the case of emission-optimized shifting and handling characteristics, to make possible a later restarting and extending of the stop phase, while it is more likely reduced in the case of sporty shifting and handling characteristics, to keep the stop phases as short as possible.

There are also methods where the pressure drop limit value may be defined as a function of a driver type classification. Such driver type classifications are realized in motor vehicles, for example, in the case of adaptive automatic transmissions.

To further customize the brake release characteristics, respectively to enhance the restarting characteristics, additional restarting conditions for executing the restart may also be introduced.

For example, the condition whereby a lower threshold is undershot to trigger the restarting function, may be supplemented. This is useful, for example, if, for any reason, defining the reference pressure value, respectively the pressure drop limit value is not possible or is unsuccessful.

Moreover, it is also possible to actuate a master brake switch upon releasing the brake. This may be combined, for example, in connection with a manual transmission or also with the selector lever of an automatic transmission. The stop status is ended, for example, or the restarting is triggered in response to the gearshift lever being moved from the park position into a driving position, thereby triggering a starting process.

There are also variants where it is possible to enable or disable the outputting of the brake pressure signal sequence, and the restarting process is triggered, for example, only in response to a brake pedal position, respectively in response to a lower pressure threshold value being undershot.

There are also situations where the restarting method is to be disabled for safety reasons or other functional reasons. These include states where a vehicle door, a luggage-compartment lid and/or an engine hood are open, for example.

Another situation may occur, for example, when a sensor or a detector records an accident situation. This includes sharply increased acceleration values, for example, the triggering of an airbag or also an unusual change from the vehicle's normal position (skidding, rolling over or the like).

To protect a current source (deep discharging of a battery), a lower voltage limit may also be specified in the electrical system, upon whose undershooting, a restarting process is not executed.

This holds similarly, for example, for a parking brake being applied at the same time so that a brake pressure-dependent restarting request should be ignored.

Another aspect of the present invention relates to a restarting assembly for a motor vehicle having a hydraulic brake system, a brake pressure sensor, a starter and a control unit, the control unit being in communication with the starter and the brake pressure sensor, and the control unit having a restarting algorithm as an executable program that may be used to implement the restarting method according to the present invention. Using a configuration of this kind, it is especially simple to implement the method according to the present invention in a vehicle purely by using a programming measure, in some instances also subsequently by a software update.

It is thereby expediently provided for the entire restarting method to be devised to be capable of being optionally enabled or disabled. One special specific embodiment thereby provides that the switch be actuatable by a transmission selector lever, for example, or that it be configured as a separate switch readily accessibly thereon.

A vehicle having such a restarting assembly may either be adapted in terms of the start-stop characteristics thereof to be driver-specific or also in terms of other boundary conditions (environmental protection/emission/fuel consumption, etc.).

BRIEF DESCRIPTION OF THE DRAWINGS

Exemplary embodiments of present invention will be described exemplarily below and with reference to the attached drawing, in which.

Figure 1:
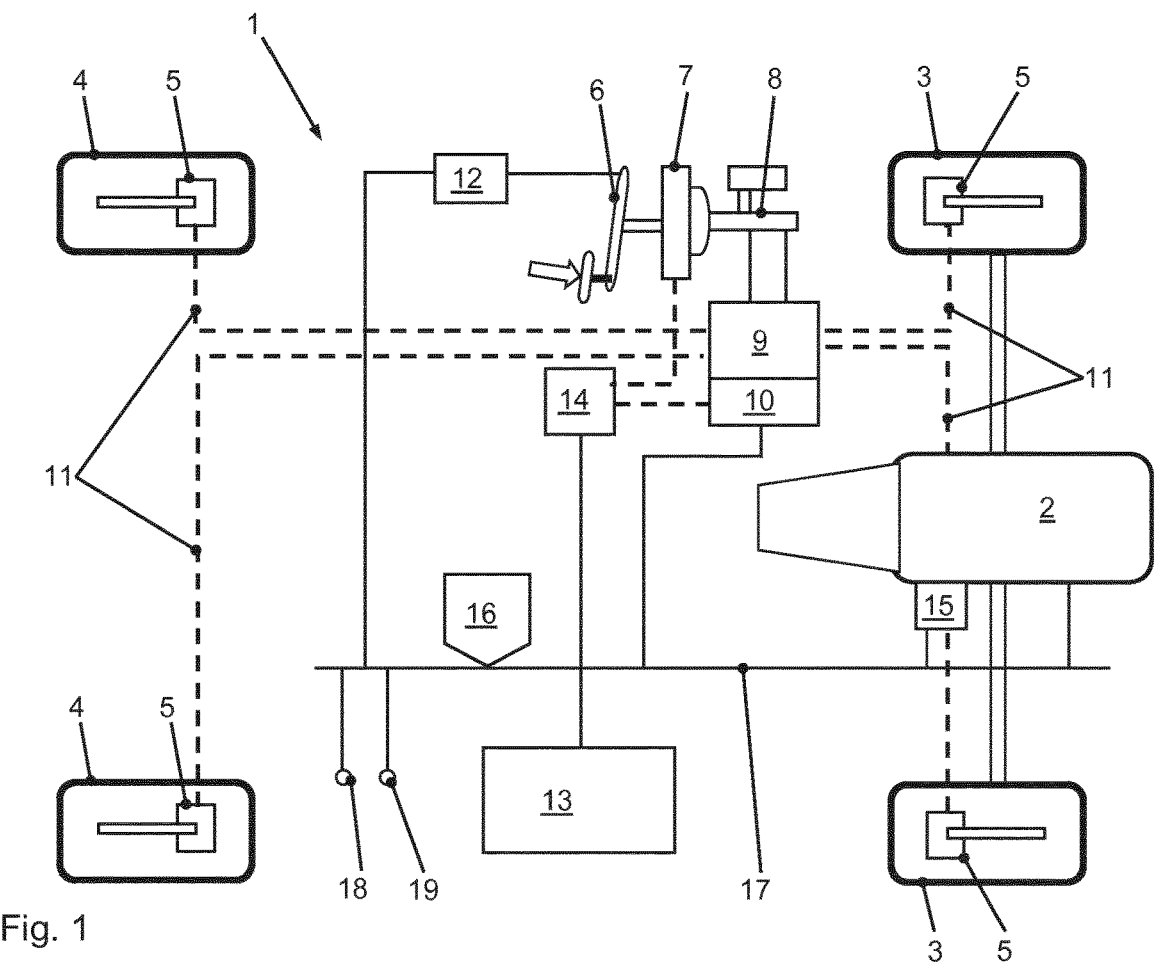
FIG. 1 is a schematic general depiction of a vehicle configuration that may be used to execute the restarting method according to the present invention, respectively that includes a restarting assembly according to the present invention.

The basic function of the restarting method according to the present invention and the requisite components are first clarified with reference to FIG. 1.

DETAILED DESCRIPTION OF THE INVENTION

The general depiction in FIG. 1 schematically shows a motor vehicle 1 having an internal combustion engine 2 that drives wheels 3. Wheels 4 are shown here as non-driven wheels. In other specific embodiments, however, they may likewise be driven. All of wheels 3, 4 have hydraulically actuatable brakes 5 that are part of a hydraulic brake system, where brakes 5 are actuated via brake pedal 6, a brake booster 7, a brake master cylinder 8, a hydraulic power unit 9 having a hydraulic pump 10, and via brake lines 11.

The actuation of brake pedal 6 is sensed by a switch 12, for example, that communicates via a signal line 17 with a control unit 13. A brake pressure sensor 14 records the brake pressure that has built up in brake lines 11 and/or in brake booster 7. It supplies brake pressure data indicative thereof to control unit 13, likewise via a signal line 17.

Internal combustion engine 2 is started, as needed, via an electrical starter 15 that likewise communicates via a signal line 17 with control unit 13 and, from there, receives a start signal, if indicated. The electrical starter may be configured as a starter generator, for example, that is integrated on the crankshaft (ISG) or is coupled via a belt drive (RSG) to the engine. It may also be an electrical drive engine in the case of a hybrid drive concept.

In addition, a bus system 16 (for example, a CAN bus system) may be provided via which the communication and signal transmission are realized among various electrical and electronic units in motor vehicle 1. This includes the internal combustion engine itself, for example, switch 12, brake pressure sensor 14, electrical starter 15, and hydraulic pump 10. Other sensors 19 and function switches 18 are likewise connected via signal lines 17 to control unit 13 and, there, may control the restarting functions described in the following.

Signal lines 17 are shown in FIG. 1 as solid lines, and hydraulic or pressure lines 11 as dashed lines.

In the case of the system described above, a start-stop functionality is realized in the following manner A brake pressure p is recorded by brake pressure sensor 14. It sends brake pressure signals indicative thereof to control unit 13. Alternatively and/or additionally, an actuation of the brake pedal may also be signaled via switch 12 to control unit 13.

In response to the build-up of a defined brake pressure, control unit 13 transmits a stop signal to the engine.

Upon the occurrence of a restarting condition, control unit 13 sends a restart signal $S_{WS}$ to electrical starter 15, which then restarts internal combustion engine 2.

The functional sequence of the method according to the present invention will now be explained with reference to FIG. 2. In this regard, a restarting algorithm having a plurality of functional blocks is retrievable in control unit 13. It is provided in control unit (13) as an executable program that may be used to implement the restarting method.

Figure 3:
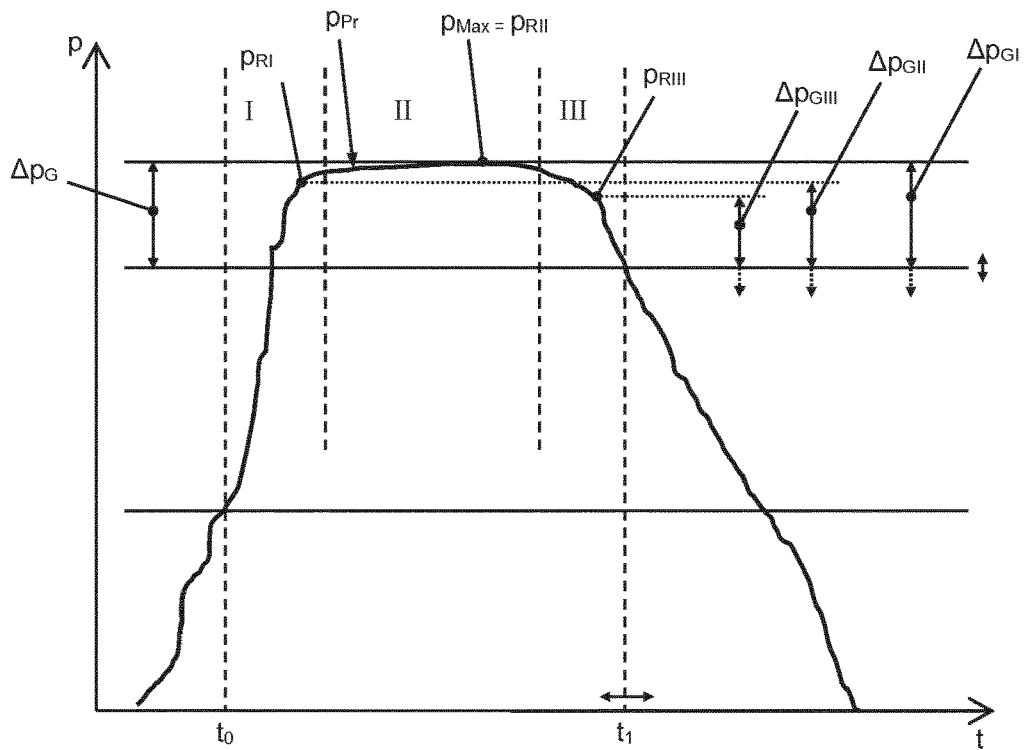
FIG. 3 is a brake pressure time diagram in which aspects of a method according to the present invention will become apparent.
Figure 4:
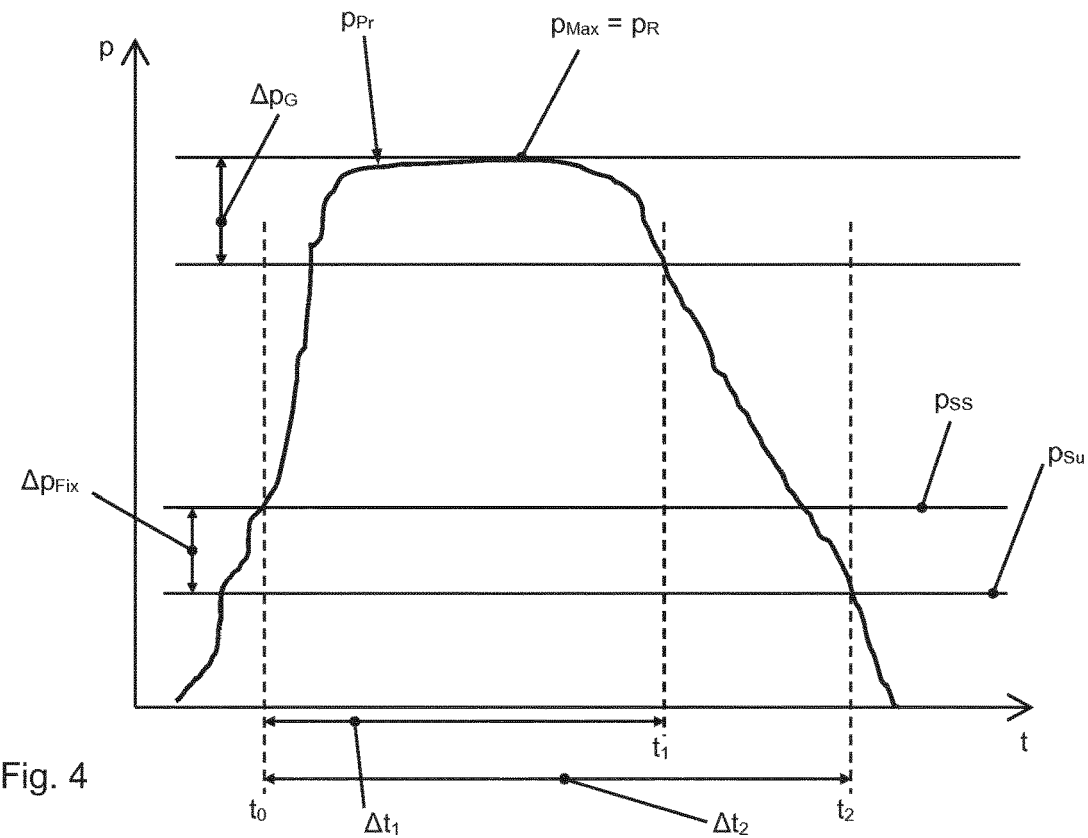
FIG. 4 is a brake pressure time diagram clarifying the difference from a related art method.
Figure 5:
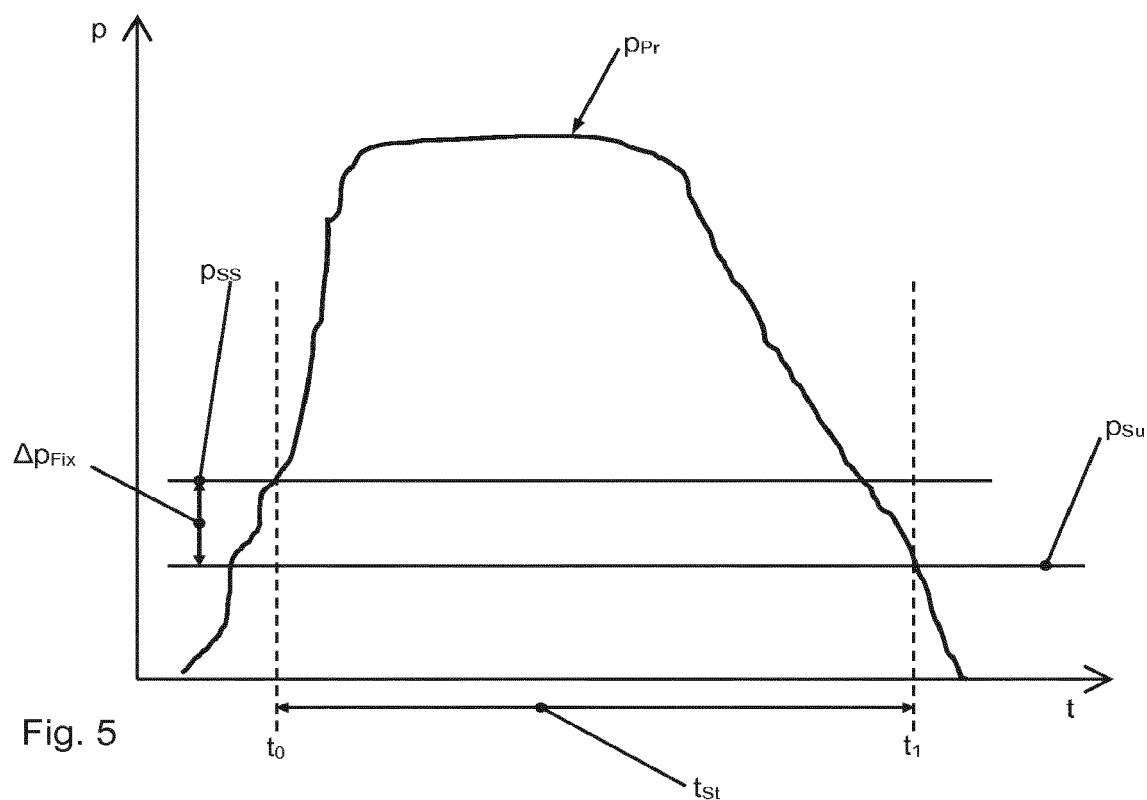
FIG. 5 is a brake pressure time diagram illustrating a known restarting method/start-stop method.

The brake pressure signals from brake pressure sensor 14, that represent brake pressure p, propagate into a first functional block 101, where they are further processed into a brake force profile $p_{Pr}$ (in this regard, see also FIG. 3-5).

In a second functional block 102, a reference pressure value $p_R$ is determined from this brake force profile $p_{Pr}$. In a third functional block 103, a pressure drop limit value $\Delta p_G$ is determined. And, in a fourth functional block 104, a brake release status is recorded when, upon releasing the brake pedal, using determined reference pressure value $p_R$ as a baseline, a brake pressure drop $\Delta p$ is recorded that undershoots pressure drop limit value $\Delta p_G$. This case occurs in response to (absolute) brake pressure p recorded by brake pressure sensor 14 undershooting the differential between reference pressure value $p_R$ and pressure drop limit value $\Delta p_G$. In a fifth functional block 105, restart signal $S_{WS}$ is then sent to starter 15, and internal combustion engine 2 is started again.

It will be explained below with reference to FIG. 3, how reference pressure value $p_R$ and pressure drop limit value $\Delta p_G$ are defined. Various approaches are possible. However, they follow from the same basic principle.

In a first exemplary embodiment, maximum brake pressure $p_{Max}$ is determined on the basis of brake pressure profile $p_{Pr}$ and specified as reference pressure value $p_R$. Using maximum brake pressure $p_{Max}$ as a baseline, the restarting condition is then specified as the pressure drop being a defined $\Delta p$ in order for restart signal $S_{WS}$ to be sent and for stop phase $t_{St}$ between $t_0$ and $t_1$ to be ended (hatched surface area in the diagram). It is thus ensured that the restart signal is generated independently of actually reached maximum brake pressure $p_{Max}$ always in response to same brake pressure drop $\Delta p$. It is, thus, possible to realize a restarting condition that is perceived as being responsive, rapid and consistent.

Alternative exemplary embodiments provide that reference pressure value $p_R$ may also be specified in a different manner, for example, by analyzing various phases/sections of the brake pressure profile. In this regard, FIG. 3 shows a profile section I in which the transition from a rising phase into a plateau phase is detected. This value $p_{RI}$ may then be specified as reference pressure value $p_R$.

In another exemplary embodiment, a falling phase (section III in FIG. 3) is considered, where the transition from the plateau phase into the falling phase is determined as $p_{RIII}$, and this value is specified as reference pressure value $p_R$.

It is also possible to only evaluate the plateau phase (section II) and, there, to calculate an average maximum value as $p_{RII}$, for example, which is then to be used as reference pressure value $p_R$.

Similarly, there are exemplary embodiments where pressure drop limit value $\Delta p_G$ is also variably determined as a function of brake pressure profile $p_{Pr}$ or in a different manner.

It is also possible to define reference pressure value $p_R$ and pressure drop limit value $\Delta p_G$ from a plurality of determined brake force profiles $p_{Pr}$ that are defined during a drive of a specific driver, for example.

Thus, it may be in a proportional relationship with reference pressure value $p_R$, for example. It may also be provided, however, that pressure drop limit value $\Delta p_G$ varies progressively, degressively or also linearly with reference pressure value $p_R$ and especially with a corresponding maximum brake pressure $p_{Max}$. This is indicated in FIG. 3 by designations $\Delta p_{GI}'$ through $\Delta p_{GIII}'$.

Figure 2:
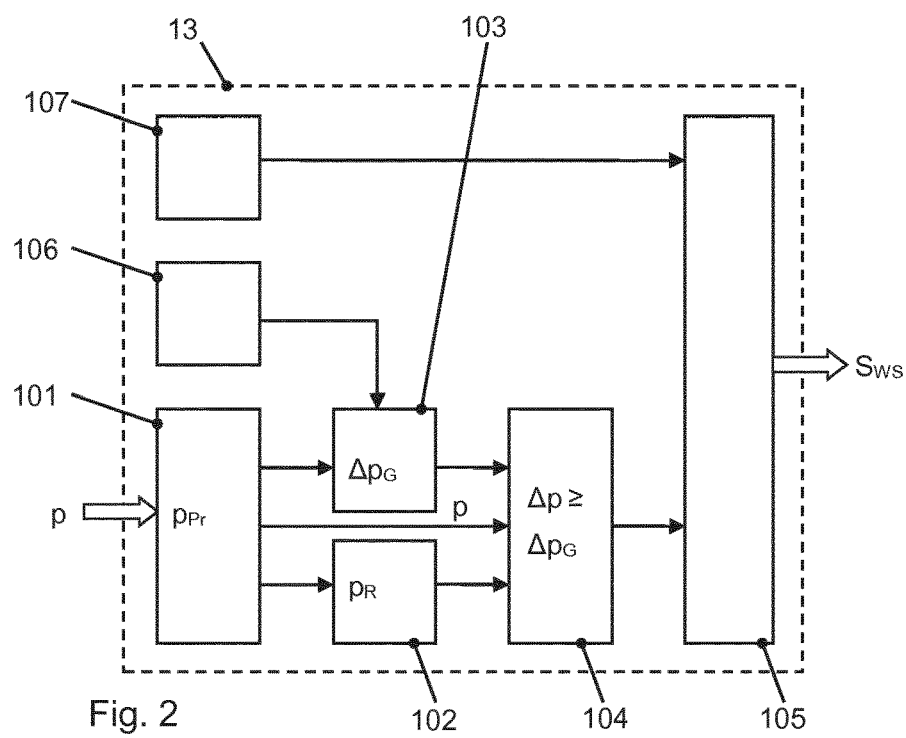
FIG. 2 is a functional diagram showing the essential components of an exemplary embodiment of a method according to the present invention.

Other conditions may be realized as a function of sixth and seventh functional blocks 106, 107 depicted in FIG. 2. For example, functional block 106 may define pressure drop limit value $\Delta p_G$ as a function of what is referred to as a driver type classification or also, alternatively, as a function of the shifting characteristics of an automatic transmission. The tendency for driving in a more or less "sporty" fashion is considered in this manner. It may be thereby assumed, for example, that pressure drop limit value $\Delta p_G$ is reduced in response to sporty shifting characteristics or a sporty driver type classification, so that an earlier restarting of internal combustion engine 2 follows.

Via seventh functional block 107, other conditions for sending restart signal $S_{WS}$ may also be taken into consideration. They may be considered as AND and/or as OR conditions. For example, this may be the additional consideration of an undershooting of a lower brake pressure threshold value $p_{SU}$, where a restart signal is to be sent.

Or restart signal $S_{WS}$ is triggered or blocked by one or more switches 18 or sensors 19. This may be realized by recording defined positions of vehicle components, such as vehicle doors, luggage-compartment lids and the engine hood, by recognizing accident situations, a lower voltage limit in the electrical system is undershot or it is signaled, for example, that a parking brake is applied, and, in such cases, a restart signal $S_{WS}$ is sent by actuation of brake pedal 6.

FIG. 4 shows the distinction from a conventional restarting request, as is described with reference to FIG. 5. The stop phase is ended in accordance with the present invention following a time period $\Delta t_1$ using maximum pressure value $p_{Max}$ as a baseline that is recorded via brake profile $p_{Pr}$ and is specified as reference pressure value $p_R$, and a specified or differently determined pressure drop limit value $\Delta p_G$. $\Delta t_1$ is the time period between points in time $t_0$ and $t_1$.

In accordance with the conventional method, the stop phase only ends after an appreciably longer period of time $\Delta t_2$ that is between points in time $t_0$ and $t_2$. Thus, a more rapid and, consequently, more responsive restarting or also earlier restarting is possible. In the method according to the present invention, the driver perceives an immediate reaction (better response behavior) to the releasing of the brake. This response behavior may be further optimized or customized by defining reference pressure value $p_R$ and pressure drop limit value $\Delta p_G$.

LIST OF REFERENCE NUMERALS 1 motor vehicle
2 internal combustion engine
3 wheels
4 wheels
5 brakes
6 brake pedal
7 brake booster
8 brake master cylinder
9 hydraulic power unit
10 hydraulic pump
11 brake line
12 switch
13 control unit
14 brake pressure sensor
15 electrical starter
16 bus system
17 signal line
18 switch
19 sensor
p brake pressure
t time
$p_{SU}$ lower threshold value
$p_{SS}$ stop threshold value
$\Delta p_{Fix}$ fixed pressure difference
$p_{Pr}$ brake force profile
$p_R$ reference pressure value
$p_{Max}$ maximum braking force
$\Delta p$ brake pressure drop
$\Delta p_G$ pressure drop limit value
$t_{St}$ engine stop time
$t_0, t_1, t_2$ points in time
$S_{WS}$ restart signal
I-III brake force profile sections
101 first functional block
102 second functional block
103 third functional block
104 fourth functional block
105 fifth functional block
106 sixth functional block
107 seventh functional block

The invention claimed is:

1. A restarting method for automatically starting an internal combustion engine of a motor vehicle by a brake pedal actuation, comprising:
   recording a plurality of brake pressures by a brake pressure sensor;
   outputting an associated brake pressure signal sequence to a control unit;
   defining a first brake pressure profile from the brake pressure signal sequence;
   determining at least one reference pressure value from the first brake pressure profile;
   wherein the at least one reference pressure value includes a first reference pressure value for a first period of time, wherein the first reference pressure value is the highest brake pressure of the plurality of recorded brake pressures of the first brake pressure profile;
   recording a brake release status in response to a brake pressure drop being recorded that exceeds a pressure drop limit value using the determined at least one reference pressure value as a baseline; and
   sending a start signal to a starter for starting the internal combustion engine in response to the brake release status being recorded.

2. The restarting method as recited in claim 1, further comprising determining a second reference pressure value as a function of a second profile section of the determined first brake pressure profile corresponding to a second period of time.

3. The restarting method as recited in claim 1, further comprising determining the at least one reference pressure value as a function of a plurality of start-stop cycles within an operating cycle by evaluating each of a plurality of brake pressure profiles of the plurality of start-stop cycles, wherein the first brake pressure profile corresponds to one of the plurality of start-stop cycles.

4. The restarting method as recited in claim 1, wherein the pressure drop limit value is defined as a proportional deviation from the determined at least one reference pressure value, or the pressure drop limit value is linearly modified in response to the determined at least one reference pressure value.

5. The restarting method as recited in claim 1, wherein the pressure drop limit value is defined as a function of adjustable shifting characteristics of an automatic transmission.

6. The restarting method as recited in claim 1, wherein the pressure drop limit value is defined as a function of a driver type classification of a particular driver.

7. The restarting method as recited in claim 1, wherein the start signal is sent in response to at least one of the following conditions being met:
   the brake release status was recorded; the brake pressure undershoots a lower threshold; and
   a master brake switch is actuated in response to the brake being released.

8. The restarting method as recited in claim 1, the outputting of the brake pressure signal sequence being able to be optionally enabled or disabled.

9. The restarting method as recited in claim 1, further comprising disabling the sending of the start signal in response to at least one of the following statuses being sensed by a switch and/or a sensor:
- a vehicle door, a luggage-compartment lid and/or an engine hood are open; there is an accident situation;
- a lower voltage limit in the electrical system is undershot; and
- a parking brake is applied.

10. A restarting assembly for a motor vehicle, comprising a hydraulic brake system,
a brake pressure sensor,
a starter, and
a control unit, the control unit being in a communication connection with the starter and the brake pressure sensor, and the control unit including a restarting algorithm as an executable program configured to implement the restarting method according to claim 1.

11. The restarting assembly as recited in claim 9, further having a switch that can be used to optionally enable or disable the restarting method.

12. The restarting assembly as recited in claim 11, wherein the switch is actuatable by a transmission selector lever or being configured thereon.

13. A vehicle comprising a restarting assembly according to claim 10.

14. The restarting method of claim 2, wherein a first profile section corresponding to the first period of time is a section of the first brake pressure profile which includes the highest brake pressure of the plurality of recorded brake pressures, the method further comprising:
detecting a first transition of the first brake pressure profile from the second profile section to the first profile section, or from the first profile section to the second profile section, and
setting the second reference pressure value to the brake pressure at the detected first transition of the first brake pressure profile.

15. The restarting method of claim 14, wherein:
the first profile section has a plateauing slope in comparison to the second profile section; and
the second profile section is a section of the first brake pressure profile with a rising slope before the first period of time or a descending slope after the first period of time.

16. The restarting method of claim 15, wherein the second profile section is the section of the first brake pressure profile with the rising slope before the first period of time, and the first brake pressure profile has a third profile section which is the section of the first brake pressure profile with the descending slope after the first period of time, the method further comprising:
detecting a second transition of the first brake pressure profile from the first profile section to the third profile section;
and
setting a third reference pressure value to the brake pressure at the detected second transition.

17. The restarting method of claim 1, wherein the pressure drop limit has a first value which is a difference between the first reference pressure value and a predefined pressure value, and a first brake release status is recorded if the break pressure drop exceeds the first value of the pressure drop limit.

18. The restarting method of claim 2, wherein the pressure drop limit has a first value which is a difference between the first reference pressure value and a predefined pressure value, the pressure drop limit has a second value which is a difference between the second reference pressure value and the predefined pressure value, and the first value of the pressure drop limit is greater than the second value of the pressure drop limit.

\* \* \* \* \*